Sept. 11, 1962 M. WEINSTEIN ETAL 3,052,983
PORCELAIN COVERED METAL-REINFORCED TEETH
Filed July 16, 1954 2 Sheets-Sheet 1

INVENTORS
MORRIS WEINSTEIN, DECEASED,
BY LENORE K. WEINSTEIN, ADMINISTRATRIX
ABRAHAM B. WEINSTEIN
BY
Harry Ernest Rubens
ATTY Sept. 11, 1962     M. WEINSTEIN ETAL     3,052,983
PORCELAIN COVERED METAL-REINFORCED TEETH
Filed July 16, 1954     2 Sheets-Sheet 2

INVENTORS
MORRIS WEINSTEIN, DECEASED,
BY LENORE K. WEINSTEIN, ADMINISTRATRIX,
ABRAHAM B. WEINSTEIN
BY
Harry Ernest Rubens
ATT'Y

United States Patent Office 3,052,983
Patented Sept. 11, 1962

3,052,983
PORCELAIN COVERED METAL-
REINFORCED TEETH
Morris Weinstein, deceased, late of Stamford, Conn., by Lenore K. Weinstein, administratrix, and Abraham B. Weinstein, Stamford, Conn., assignors, by direct and mesne assignments, to Permadent Manufacturing Corporation, Brooklyn, N.Y.
Filed July 16, 1954, Ser. No. 443,872
7 Claims. (Cl. 32—12)

Our invention relates to artificial tooth structures of the type whereby a metal substructure to which porcelain has been fused is used to cap existing teeth and replace missing teeth.

Our invention further relates to prefabricated and therefore standarized teeth that are readily available for the foregoing uses.

The materials hitherto available for this type of dental prosthetics have been platinum alloys of iridium or ruthenium, and conventional dental porcelains having fusing points between 1850 and 2400° F. Their use has involved serious procurement problems, difficult fabrication techniques, and finally a product which is inherently liable to a high degree of failure in service.

As a consequence, the dental profession has limited the use of porcelain to an esthetic role mainly in the anterior teeth, and have relied entirely on gold crowns and bridgework for the rest of the mouth, or wherever strength was required.

The platinum alloys are very costly, and in war-time scarcely available. Their melting points are in the region of 3350° F., where it is difficult to obtain the necessary precision in casting. Finally, the thermal expansion coefficients of the platinum alloys and the prior dental porcelains are sufficiently divergent to yield a product in which the porcelain member is in a high state of stress. For example, prior dental porcelains having expansion coefficients of about 75–80×10$^{-7/°}$ C. have been fused to iridio platinum alloys having expansion coefficients of about 90×10$^{-7/°}$ C. The other metals used, such as palladium, possess coefficients of expansion running from 90 to 150×10$^{-7/°}$ C., and accordingly have even a greater disparity between the coefficients of expansion of the metal and existing dental porcelains, resulting in greater stresses in the porcelain. Little additional stress is needed in service to initiate fracture in the porcelain.

There are additional shortcomings in the use of the prior materials. It is difficult to grind through the porcelain to the metal substrate without chipping and fracturing the thinned-out porcelain most nearly adjacent to the metal. This is due to the high state of stress at the porcelain-metal interface which the porcelain becomes progressively less able to endure as it becomes thinner.

A further limitation is that prior porcelains are not designed to be fused to metal and therefore cannot compensate for adverse optical qualities introduced into the semitranslucent body by the proximity of a grey metal substrate.

While the shortcomings enumerated above have been almost prohibitive to the practice of this technique of dental prosthetics, its potential for the advancement of dentistry has been sufficiently great to require the removal of these limitations. Authorities agree that full coverage of a tooth which has been treated for decay or is susceptible to decay or is to be saved from immediate or later extraction is the only mechanical guarantee against secondary decay and ultimate extraction. It is a basic requirement in the practice of full mouth rehabilitation. It is also one of the few effective remedies in cases of rampant caries.

The value of the technique of fusing porcelain to a metal substrate can be apreciated from the following:

(a) No metal need shown in the oral cavity, as it may be entirely covered with porcelain to yield a natural restoration in appearance.

(b) The restoration is far more resistant to wear than the prior plastic and metal restoration.

(c) The color permanency and dimensional stability of the porcelain restoration far exceed that of the prior plastic and metal restoration.

The development of ordinarily unbreakable standardized porcelain covered metal-reinforced teeth would enable the spread of the most reliable dentistry to the largest numbers of patients previously unable to avail themselves of lasting full coverage in porcelain due to cost, thereby stimulating the skills and interest of the profession where formerly it was often felt futile to propose such treatment. Extensive corrections of the bite to balanced occlusion for the treatment of periodontoclasia will be more readily undertaken. It enables and encourages the use of fixed bridgework instead of removable bridgework, thus avoiding any causes of periodontoclasia and providing a chewing surface closer in natural function, not only in appearance, to that of natural teeth. Where required, it may also be employed in making removable restorations.

The physical and optical requirements of dental porcelains are exacting in their demands upon color range, translucency, opacity, insolubility, mechanical strength, maturing temperature, fusion range, etc. When porcelains are to be fused to metals to be suitable for our purposes it is required further that their expansion coefficients be in agreement. In addition, the expansion coefficient of the porcelain should be substantially independent of its previous thermal history. The last requirement is necessary because during the process of applying the dental porcelain to metal the combination is subject to many firings, the actual number being indeterminate. Further, new porcelain is constantly being added, either to the metal, or to the porcelain which has already been fused in place. During the process of working, therefore, the porcelain will consist of portions having widely different thermal histories and therefore differing degrees of maturity. It is therefore essential that the porcelain, from biscuit bake through the various degrees of vitrification and glaze, have an expansion coefficient which matches the metal substrate and remains unchanged throughout the firing process. The porcelain to be described is unique in this respect.

Accordingly, it is an object of our invention to make available to both dentist and laboratory radically new methods, techniques and materials for capping existing teeth and for replacement of missing teeth by fixed or removable bridgework.

Other objects of our invention are to provide an ideal shape for the metal substrate that will support the porcelain at all points to prevent fracture of the porcelain body, to provide teeth that are manufactured under mass production techniques to lower the cost of such teeth to the patient by reducing the labor of the dentist and laboratory, to provide mass produced teeth that are better looking, of greater strength and greater uniformity than are available to the average dentist; and to provide such teeth with specially designed metal substrates that can accommodate a standard jacket, should the porcelain covering be accidentally damaged.

We accomplish these and other objects and obtain our new results as will be apparent from the device described in the following specification, particularly pointed out in the claims, and illustrated in the accompanying drawings, in which:

FIG. 10 is a mesio-distal cross section of the same.

FIG. 11 is a bucco-lingual cross section of the same.

FIG. 12 is a lingual view of the same.

FIG. 13 is a proximal view of the same.

FIG. 14 is an exploded mesio-distal cross section view of a prefabricated molar pontic with replacement unit.

FIG. 15 is an exploded bucco-lingual cross section view of the same.

FIG. 16 is an exploded bucco-lingual cross section view of a prefabricated molar crown and replacement unit.

FIG. 17 is an exploded mesio-distal cross section view of the same.

FIG. 18 is an exploded bucco-lingual cross section view of the same.

FIG. 21 is a labial view of a standardized metal core for a standardized anterior tooth.

FIG. 22 is a proximal view of the same.

Figure 1:
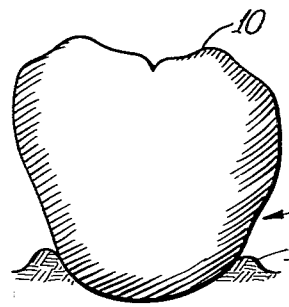
FIG. 1 is a buccal view of a standardized molar tooth.

Alloys based primarily upon palladium form an ideal substrate for the fusion of porcelain. These alloys are comparable in cost to gold, are readily available, can be hardened in a controlled manner, are light in weight, free from corrosion, and benign to mouth tissue. Further, their melting points are several hundred degrees lower than the prior platinum alloys (2930° F. vs. 3362° F.), thereby facilitating precision in casting.

A combination of a palladium-containing metal base having a coefficient of expansion of between 90 and $160 \times 10^{-7/°}$ C., depending on the amount of palladium present, can be successfully coated with a suitable dental porcelain having an expansion coefficient not greater than the palladium-containing base. We use as an example, a palladium alloy containing 6½% ruthenium. For the purpose of modifying the physical properties and the expansion properties, we can add other metals, such as platinum, silver, gold and copper, or use other alloys of these metals to give alloys which possess a higher fusion point than the selected porcelain, and an expansion coefficient matched thereto.

A dental porcelain consists of at least three separate and distinct porcelain bodies. The body porcelain is used to construct the principal bulk of the artificial tooth structure. The translucency porcelain, which fuses to a relatively clear, glass-like material, is used to provide translucency in the incisal tips of the artificial tooth structure. It may also be used to reduce the opacity of the body porcelain. The opaque porcelain is used to mask out the grey metal substrate. Its use is essential where the body porcelain is thin and in general is beneficial to the overall color esthetics of the porcelain reconstruction. All of these bodies must have approximately the same expansion coefficient.

Several methods of manufacturing and dental porcelain are possible. As an example we can add 15 parts of a powdered glass consisting of 50.0% $SiO_2$, 7.0% $Al_2O_3$, 10% CaO, 5.0% MgO, 8.0% $Na_2O$, and 20.0% $K_2O$, to 85 parts of a powdered natural feldspar having a theoretical composition of 16.17 parts of albite and 83.83 parts of orthoclase, to obtain a frit (No. 1) having a composition by analysis, as follows:

| | Percent |
|---|---|
| $SiO_2$ | 63.4 |
| $Al_2O_3$ | 16.70 |
| CaO | 1.50 |
| MgO | 0.80 |
| $Na_2O$ | 3.41 |
| $K_2O$ | 14.19 |
| | 100.00 |

The mixture is fired for two hours at 2400° F. (about cone 15) and thereafter cooled and powdered. Its fusion point is about 1900° F.

We add the above powdered frit (No. 1) to a powdered fusion product (No. 2) of a mixture of about 75% natural feldspar and about 25% silica, which has the following composition:

| | Percent |
|---|---|
| $SiO_2$ | 73.50 |
| $Al_2O_3$ | 14.40 |
| CaO | 0.23 |
| MgO | 0.10 |
| $Na_2O$ | 1.75 |
| $K_2O$ | 10.00 |
| | 100.00 |

Its fusion point is about 2350° F.

A mixture of equal parts of the powdered frit (No. 1) and the above fusion product (No. 2) results in the following composition (No. 3):

| | Percent |
|---|---|
| $SiO_2$ | 68.45 |
| $Al_2O_3$ | 15.55 |
| CaO | 0.90 |
| MgO | 0.45 |
| $Na_2O$ | 2.55 |
| $K_2O$ | 12.10 |
| | 100.00 |

This represents the analyzed chemical composition of the finished high-expansion porcelain. It has an expansion coefficient of slightly less than $125 \times 10^{-7/°}$ C. and a maturing or fusing range around 2100° F. A porcelain made as described above is unique in that its expansion coefficient is substantially independent of the maturing cycle.

The dental porcelain may be brought to a glaze without danger of losing the fine contours and carvings that may be used to set up an ideal reproduction. This is possible only when an adequate maturing range exists, i.e., a high viscosity at glazing temperature.

The porcelain may be adjusted to have an expansion coefficient somewhat lower than that of the metal base. By this means the ceramic is placed in compression when it is strongest, rather than in tension, when it is weakest. Small amounts of clay ranging from 0 to 5% may be added depending on the opacity desired.

The above identified porcelain when applied to the described palladium base support will have an expansion coefficient which matches the metal substrate of the palladium alloy of our example, without change from biscuit bake through the various degrees of vitrification and glaze.

A natural felspar can be modified by changing the ratios of its various ingredients to obtain an expansion coefficient between 90 and 160, a fusion range between 1750° F. and 2400° F. Such modification can produce a dental porcelain having the desired optical properties and physical characteristics, i.e, translucency, opacity, insolubility, strength, maturity, range, and impact strength.

In the conversion of felspar into the final dental porcelain we use a frit obtained by firing felspar containing approximately 80.0% orthoclase at a temperature not less than 2400° F. (about cone 15) until all the material is in a glassy state. This furnishes a basic material for converting an ordinary spar consisting of between 70.0% and 90.0% orthoclase. To this orthoclase spar, approximately between 5.0% and 30.0% of silica is added and the orthoclase spar fired until the silica is sufficiently absorbed to give the desired degree of translucency. This mixture is cooled and ground to suitable particle size and then mixed in equal parts with the orthoclase spar that has been fired until it reaches a glassy stage (about cone 15). The resulting mixture is suitable for our purposes and yields a porcelain with completely satisfactory optical and mechanical properties, a fusion range of about 2200° F., and an expansion coefficient of about $125 \times 10^{-7}/°$ C. This is suitable for a palladium-6.5% ruthenium alloy and may be used for our purpose. It is understood that other ratios of the frits will give other expansion coefficients and other fusing ranges within the limits needed for the metal selected as the base.

The above is a description of the principles governing the making of a high expansion dental porcelain. The following is a detailed description of the manufacturing process:

To three parts of orthoclase spar having the following composition:

|  | Percent |
|---|---|
| $SiO_2$ | 65.6 |
| $Al_2O_3$ | 18.4 |
| $Na_2O$ | 2.55 |
| $K_2O$ | 13.2 |
| CaO, MgO | 0.25 |
|  | 100.00 | is added one part of silica. Both materials are ground to pass through a 200 mesh screen. They are carefully blended, and fired at 2400° F. for two hours (about cone 15). The fused mass is then crushed, separated from iron introduced by the crushing operation, and ground to pass 100% through a No. 16 silk screen. This constitutes the body of dental porcelain whose thermal expansion we desire to raise. It now has a composition of about:

|  | Percent |
|---|---|
| $SiO_2$ | 73.50 |
| $Al_2O_3$ | 14.45 |
| $Na_2O$ | 1.75 |
| $K_2O$ | 10.00 |
| CaO, MgO | 0.20 |
|  | 100.00 |

To one part of the above material is added one part of the frit (No. 1) which has also been ground to pass 100% through a No. 16 silk screen. This results in the final composition (No. 3):

|  | Percent |
|---|---|
| $SiO_2$ | 68.45 |
| $Al_2O_3$ | 15.55 |
| CaO | 0.90 |
| MgO | 0.45 |
| $K_2O$ | 12.10 |
| $Na_2O$ | 2.55 |
|  | 100.00 |

This represents an analyzed chemical composition of a finished high-expansion dental porcelain having an expansion coefficient of $125 \times 10^{-7}/°$ C. and a maturing range around 2150° F. As such, this product, when suitably colored by any of the methods known to those skilled in the art, will fuse successfully to palladium-6.5% ruthenium alloy.

Figure 2:
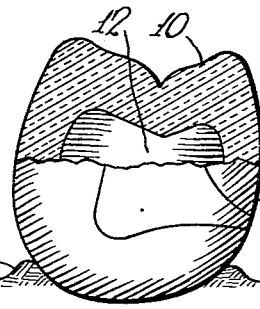
FIG. 2 is a bucco-lingual fragmented cross section of the same.
Figure 8:
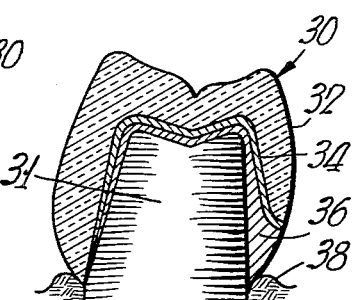
FIG. 8 is a bucco-lingual cross section of the same.
Figure 9:
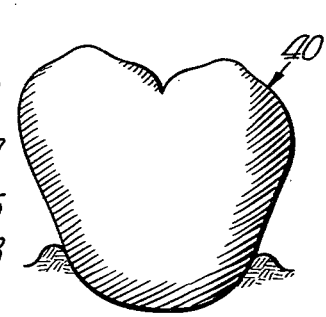
FIG. 9 is a buccal view of a prefabricated abutment molar jacket.

In the manufacture of teeth employing our invention, we have discovered that the metal substrate should possess an outer surface generally conforming to the outer surface of the dentine structure of the natural tooth. In FIG. 2, there is shown, partly in cross-section, the occlusal portion 10 of a metal core 12 in a typical standardized molar restoration 14 in position on the gums 13. Such a restoration may be a standardized pontic, as shown in FIGS. 3 to 6, or a standardized molar crown for a natural tooth, as shown in FIG. 8. In every case hereafter it will be understood that applicants are referring to standardized teeth with respect to size and shape and to similarly standardized metal cores.

In each case the metal core 12 is generally positioned just below the outer surface to provide a reinforcing structure substantially throughout the entire layer of the porcelain covering 15 to support it against failure. By matching the coefficients of expansion of the metal to that of the porcelain, a relatively thin coating of porcelain may, for the first time, be employed for teeth, which covering is free of tension and therefore will not crack as does present commercial dental porcelain used on similar metal substrates.

Figure 3:
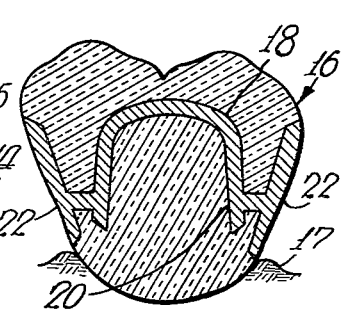
FIG. 3 is a mesio-distal cross section of such a tooth in the form of a prefabricated molar pontic.
Figure 4:
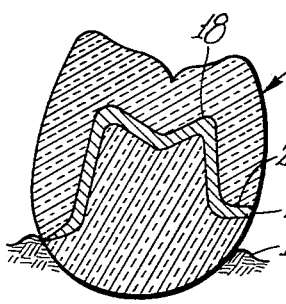
FIG. 4 is a bucco-lingual cross section of the same.
Figure 5:
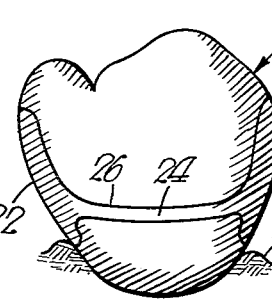
FIG. 5 is a lingual view of the same.
Figure 6:
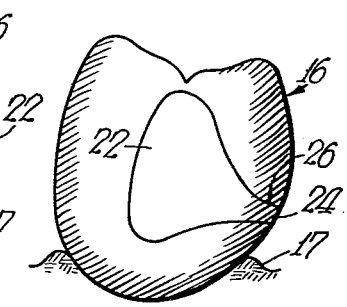
FIG. 6 is a proximal view of the same.
Figure 19:
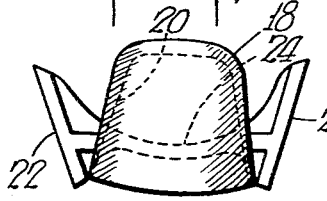
FIG. 19 is a buccal view of a standardized metal core for a standardized molar tooth.
Figure 20:
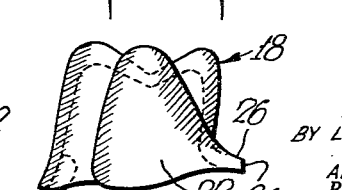
FIG. 20 is a proximal view of the same.

In manufacturing a molar pontic 16 as is shown in section, FIG. 3, on the gums 17, the core 18 is made hollow as at 20 to reduce the weight of the metal, and therefore the cost, and to provide better retention for the porcelain. The pontic illustrated is provided with wing sections 22 which extend to the surfaces, forming metal contact areas for attachment to metal areas on adjacent supporting teeth. A collar 24 may extend around the lingual surface to give greater strength to the core, and to provide a peripherally extending strength to the core, and to provide a peripherally extending shoulder 26 for a purpose which will be hereinafter explained. In FIGS. 19 and 20 enlarged views of the metal core are illustrated.

Figure 7:
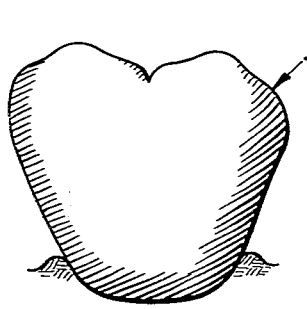
FIG. 7 is a buccal view of a standardized prefabricated molar crown in position over prepared tooth.

The stock molar crown 30 illustrated in FIGS. 7 and 8 comprises the outer porcelain cover 32 fused to the metal core 34. In such case the tooth structure 31 is prepared in the slightly tapered form illustrated. A taper of about 5° is satisfactory. The crown 30 is fitted over a wax impression of the tooth, not shown, which is subsequently cast in gold or other suitable metal 36 to closely fit the margins adjacent the gums 38. By this means, the stock molar crown now has a perfect fit for the tooth 31 to which it is cemented. Metal foil can be used in place of the wax and fused to the crown.

In the abutment crown 40 of FIGS. 9 to 13, the porcelain 42 is fused to a metal core 44 provided with contact openings 45, which may be filled with the cast metal 46 to join the standard size metal core to a particular tooth 48, fitting the margins of the tooth at the gums 47, as described above. Thus the contact surfaces 50 are formed by the cast metal. The lingual band 52 is positioned as shown in FIGS. 12 and 13.

Because porcelain, no matter how strong and reinforced, may be broken by accident, we have provided a replacement unit which may be slid over any of our metal cores when that portion of the porcelain covering to be replaced is stripped therefrom. Such a unit 54 is shown in cross-section in FIGS. 14 and 15 in exploded position in relation to the pontic 16 of FIGS. 3 and 4. The unit comprises a relatively thin metal liner 56 fused to the porcelain cover 58, which will slide over and closely fit the metal core 18 of the pontic 16. Thus by using standardized sizes and shapes for the metal cores, replacement units may be quickly refitted to teeth of our invention, the porcelain of which may be accidentally broken. To facilitate such fitting, our standardized metal core is provided with a lingual shoulder 26 as previously described, and the replacement liner extends to said shoulder on the lingual side, and to slightly under the free margin 57 of the gums 59, at the core edge 27 on the facial side as shown in FIG. 15. Where the contact areas 22 are used, the replacement liner fits tightly to the cleaned margins 25 of the contact areas.

FIG. 16 illustrates a replacement crown 60 for original crown 30 of FIGS. 7 and 8 comprising porcelain covering 62 and metal liner 64 being fitted over the molar crown core 34, previously affixed to casting 36 cemented to the prepared tooth 31 of FIG. 8.

FIGS. 17 and 18 illustrate replacement crowns 66 for original abutment crowns 40 of FIGS. 9–13, replacing removed porcelain coverings 42.

In FIGS. 21 and 22 we have disclosed standardized metal cores 18a for anterior teeth, similar in design to standardized cores 18 for posterior teeth as illustrated in the previous figures, FIGS. 19 and 20. Corresponding parts are similarly designed followed by the letter "a."

The teeth of our invention are thus provided with porcelain having the requisite color, range, translucency, opacity, insolubility, mechanical strength, maturing range, fusion range and a matched coefficient to the metal substrate which will remain matched throughout the temperature ranges involved in the firing process.

By proper manipulation and processing of the ingredients of the porcelain, it is possible to obtain coefficients of expansion which will match the coefficient of expansion of metals used in the mouth, such as platinum, palladium, etc.

In general, we employ a permanent metal mold for making our standardized teeth, which mold defines the outer configuration of the tooth we are making to the standard size and shape. Thereafter, we insert the proper size and type of standardized metal core therein and position it with respect to the mold in a manner known to the art of casting. To the porcelain is added a binder, such as starch and water which places the porcelain in condition for molding and for retaining its shape when the forms are removed and the tooth inserted in the baking ovens where the porcelain and metal are fused to each other.

By employing standardized sizes and shapes, it is possible to mass produce the porcelain covered metal-reinforced teeth of our invention which are less expensive than custom made teeth, and easier to install on a patient. By our process, it is possible to prepare dental bridges made of standardized porcelain covered metal-reinforced teeth that have no metal showing; which have a controlled color, brilliance and hue; of great strength; that are biologically compatible; that are simple in construction; that may be readily soldered; that are designed to furnish maximum support to the porcelain to minimize breakage; and that are individually readily replaceable without removal of previously installed metal connections, all without further show of metal.

By our invention, the dental profession can, for the first time, safely rehabilitate the entire mouth, or any part thereof, in porcelain. Thus the patient can receive the full benefits of porcelain, such as superior tissue tolerance, increased wear resistance vital in the treatment of pyhorrea, and improved color and dimensional stability over acrylic restorations now being used.

By the use of teeth employing our invention, we can correct the bite and balance occlusion in the case of periodontoclasia, so that the delicate and vital equilibration obtained will be best maintained due to the relatively small amount of wear encountered compared to the wear of gold. This is essential to real and lasting success in the treatment, control and prevention of periodontoclasia.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claims, and by means of which objects of our invention are attained and new results accomplished, as it is obvious that the particular embodiments herein shown and described are only some of the many that can be employed to attain these objects and accomplish these results.

We claim:

1. The method of manufacturing dental constructions, each consisting of a porcelain outer covering and a metal core which comprises preparing a permanent mold for forming standardized porcelain coverings, each having a uniform outer shape, inserting a metal core therein having an outer surface generally conforming to the dentine surface of the structure of a natural tooth of the same size and shape as the covering, and positioned beneath and substantially throughout the inner surface of the mold defining the outer covering; filling the space between the metal core and the mold with a porcelain material having substantially the same coefficient of expansion as the metal core, removing the porcelain covered core and heating the same to a temperature sufficient to fuse the porcelain to the metal.

2. The method of covering a tooth wherein the dentine is exposed, which comprises preparing a metal core having an inner surface of standardized size and shape, and an outer porcelain covering fused thereto in the shape of a tooth standardized as to size and shape, preparing a wax pattern of the space between the prepared tooth and the metal core to position the porcelain covered metal core properly over the prepared tooth, thereafter casting the wax pattern into metal, and fusing the porcelain covered metal core to the metal casting for final cementing to the tooth.

3. The method of covering a tooth wherein the dentine is exposed, which comprises preparing a metal core having an inner surface of standardized size and shape, and an outer porcelain covering fused thereto in the shape of a tooth standardized as to size and shape, preparing a gold foil pattern of the space between the prepared tooth and the metal core to position the porcelain covered metal core properly over the prepared tooth, and thereafter fusing the gold foil to the metal core for final cementing to the tooth.

4. A porcelain covered reinforced tooth comprising a molded porcelain covering of standardized shape, and a metal core having an outer surface conforming to the dentine surface of a natural tooth of the size and shape as the standardized molded covering, said porcelain covering having substantially the same coefficient of expansion as the metal core and heat fused thereto.

5. The metal core of claim 4 provided with a laterally extending wing section forming a substantial contact area in the proximal surface of the porcelain tooth for attachment to a metal portion of an adjacent tooth.

6. The metal core of claim 5 wherein the contact area extends from the edge of the gum line at the proximal surface toward the occlusal area.

7. The method of providing a replacement for the standardized porcelain covering of the dental construction manufactured by the method of claim 1, which comprises preparing a second metal core conforming on its inner surface to the outer surface of the first metal core, and preparing a new porcelain covering therefor by inserting the second metal core into the permanent mold for forming standardized porcelain coverings, filling the space between the second metal core and the mold with the porcelain material having the same coefficient of expansion as the second metal core, removing the porcelain covered second core, and heating the same to a temperature sufficient to fuse the porcelain to the second metal core.

References Cited in the file of this patent

UNITED STATES PATENTS

| | | |
|---|---|---|
| 1,248,242 | Babcock | Nov. 27, 1917 |
| 1,803,680 | Schwartz | May 5, 1931 |